United States Patent
Yu et al.

(10) Patent No.: US 8,893,191 B2
(45) Date of Patent: Nov. 18, 2014

(54) METHOD, APPARATUS AND SYSTEM FOR RENEWING PROGRAM

(75) Inventors: Dawei Yu, Shenzhen (CN); Yaosheng Lin, Shenzhen (CN); Zhikun Guo, Shenzhen (CN); Yu Tan, Shenzhen (CN); Yudong Hong, Shenzhen (CN); Feng Wang, Shenzhen (CN)

(73) Assignee: Huawei Device Co., Ltd, Shenzen (CN)

( * ) Notice: Subject to any disclaimer, the term of this patent is extended or adjusted under 35 U.S.C. 154(b) by 296 days.

(21) Appl. No.: 13/044,081

(22) Filed: Mar. 9, 2011

(65) Prior Publication Data

US 2011/0162012 A1 Jun. 30, 2011

Related U.S. Application Data

(63) Continuation of application No. PCT/CN2009/073883, filed on Sep. 11, 2009.

(30) Foreign Application Priority Data

Sep. 16, 2008 (CN) .......................... 2008 1 0222304
Sep. 25, 2008 (CN) .......................... 2008 1 0216325

(51) Int. Cl.
| H04N 5/445 | (2011.01) |
| H04N 21/472 | (2011.01) |
| H04N 5/782 | (2006.01) |
| H04N 7/16 | (2011.01) |
| H04N 21/433 | (2011.01) |
| H04N 21/45 | (2011.01) |
| H04N 21/488 | (2011.01) |

(52) U.S. Cl.
CPC ......... *H04N 7/163* (2013.01); *H04N 21/47214* (2013.01); *H04N 5/782* (2013.01); *H04N 5/44543* (2013.01); *H04N 21/4334* (2013.01); *H04N 21/4532* (2013.01); *H04N 21/4882* (2013.01)
USPC .................................. 725/58; 725/39; 725/50

(58) Field of Classification Search
USPC .......................................... 725/40, 47, 50, 58
See application file for complete search history.

(56) References Cited

U.S. PATENT DOCUMENTS 6,721,953 B1 * 4/2004 Bates et al. ..................... 725/39
6,782,550 B1 * 8/2004 Cao .................................. 725/39

(Continued)

FOREIGN PATENT DOCUMENTS

| CN | 1143882 A | 2/1997 |
| CN | 1426659 A | 6/2003 |

(Continued)

OTHER PUBLICATIONS

Rejection Decision of Chinese Application No. 200810222304.7, date of mailing Apr. 19, 2012, 17 pages.

(Continued)

*Primary Examiner* — Kieu Oanh T Bui
(74) *Attorney, Agent, or Firm* — Slater & Matsil, L.L.P.

(57) ABSTRACT

A method, system, and apparatus for renewing a program are disclosed. The method includes: obtaining programs associated with a set renewed program according to the renewed program; using one or more of the obtained associated programs as successive programs to the renewed program; and renewing the successive programs automatically. The present invention brings the following benefits: Programs in multiple series or programs associated with a program can be renewed automatically, which overcomes the problems in the prior art, namely, separate renewal of every episode of a program series or separate renewal of programs associated with a renewed program, complicated user operations, and poor user experiences.

22 Claims, 18 Drawing Sheets

(56) References Cited

U.S. PATENT DOCUMENTS

| | | | |
|---|---|---|---|
| 7,082,254 | B1 | 7/2006 | Rashkovskiy et al. |
| 2004/0019909 | A1 | 1/2004 | Takahashi |
| 2004/0031058 | A1* | 2/2004 | Reisman ............... 725/112 |
| 2005/0204388 | A1 | 9/2005 | Knudson et al. |
| 2006/0053446 | A1 | 3/2006 | Kim et al. |
| 2006/0064716 | A1* | 3/2006 | Sull et al. ............... 725/37 |
| 2006/0215994 | A1* | 9/2006 | Sasabe ............... 386/95 |
| 2007/0154163 | A1 | 7/2007 | Cordray |
| 2007/0248317 | A1 | 10/2007 | Bahn |
| 2007/0250844 | A1 | 10/2007 | Collacott |
| 2008/0098429 | A1 | 4/2008 | Urabe et al. |

FOREIGN PATENT DOCUMENTS

| | | |
|---|---|---|
| CN | 1770838 A | 5/2006 |
| CN | 1980360 A | 6/2007 |
| CN | 101051516 A | 10/2007 |
| CN | 101141587 A | 3/2008 |
| CN | 101170661 A | 4/2008 |
| CN | 101370104 A | 2/2009 |
| CN | 101378495 A | 3/2009 |
| EP | 1 355 489 A2 | 10/2003 |
| EP | 1 784 009 A2 | 5/2007 |
| JP | 2001-132077 A | 5/2001 |
| WO | WO 2007/004815 A1 | 1/2007 |
| WO | WO 2008/015618 A2 | 2/2008 |

OTHER PUBLICATIONS

4th Chinese Office Action, Application No. 200810222304.7, Mailing Date Oct. 10, 2011, 9 pages.

International Search Report, PCT/CN2009/073883, date of mailing Dec. 17, 2009, 4 pages.

Chinese Office Action, Chinese Application No. 200810216325.8, with partial English translation, Aug. 7, 2009, 14 pages.

Chinese Office Action, Chinese Application No. 200810222304.7, with partial English translation, Sep. 18, 2009, 10 pages.

Chinese Office Action, Chinese Application No. 200810216325.8, with partial English translation, Feb. 5, 2010, 15 pages.

Chinese Office Action, Chinese Application No. 200810216325.8, with partial English translation, Jul. 29, 2010, 13 pages.

Third Chinese Office Action, Chinese Application No. 200810222304.7, Dated: Jul. 5, 2011, 12 pages.

Extended European Search Report European Application No. 09814038.7-1522/2299712, Applicant: Huawei Device Co., Ltd., Dated: Jul. 7, 2011, 6 pages.

Written Opinion of the International Searching Authority, International Application No. PCT/CN2009/073883, Applicant: Shenzhen Huawei Communicaton Technologies Co., Ltd.,et al. Dated: Dec. 17, 2009, 5 pages.

Chinese Office Action, Chinese Application No. 200810222304.7, Applicant: Huawei Technologies Co., Ltd., Dated: Feb. 17, 2011, 9 pages.

* cited by examiner

TV program

| Channel | Date | Time of play |
|---|---|---|
| Information about favorite programs on the current channel | | |
| Channel A  Renewed by default  Yes | | |
| Episode n of program T | 08 08 | 12:00 -13:30 |
| Channel B  Renewed by default  No | | |
| Episode n+k of program T | 09 09 | 18:00 - 19:30 |
| Channel C  Renewed by default  No | | |
| Episode n+j of program T | 08 08 | 21:00 -19:30 |

FIG. 11

METHOD, APPARATUS AND SYSTEM FOR RENEWING PROGRAM

This application is a continuation of International Application No. PCT/CN2009/073883, filed on Sep. 11, 2009, which claims priority to Chinese Patent Application No. 200810222304.7, filed on Sep. 16, 2008 and Chinese Patent Application No. 200810216325.8, filed on Sep. 25, 2008, all of which are hereby incorporated by reference in their entireties.

TECHNICAL FIELD

The present invention relates to information processing technologies, and in particular, to a method, an apparatus, and a system for renewing a program.

BACKGROUND

With the development of the digital television technology, Set Top Boxes (STBs) are prevalent in the everyday life of people, and it is convenient for people to watch digital television programs. Getting home after working for a day, people are accustomed to turning on the television to find favorite programs. Currently, the Electronic Program Guide (EPG) provided by the STB and the integrated digital television provides information about all programs available to the audience, and is an essential technique that constitutes an interactive television. By using the EPG, the audience can find favorite programs conveniently. The EPG includes basic functions such as providing additional information about programs, categorizing programs, reserving programs, and controlling programs by parents according to levels.

In the prior art, when a user selects a favorite program, the program delivered by the server system on the cable television network includes the name and play time of the program. After the program is delivered, the STB retrieves the information about the program played by the network server, and displays the information to the user through the EPG. The user sets the favorite program or the program to be renewed according to the information about the current program. Afterward, the user invokes the set program manually.

In the prior art, when the user renews a program that is not played currently, each operation renews only one episode. Therefore, multiple operations are required if a TV series is composed of several episodes. As shown in FIG. 1, the program renewal procedure in the prior art is as follows:

(1) The user renews a program on a channel.

(2) The STB stores the channel information, program name, and program time of the program into a non-volatile memory of the STB.

(3) When the local time of the STB is equal to or a few seconds earlier than the play time of the renewed program, a dialogue box appears on the TV screen, asking whether the user wants to access the renewed program.

(4) If the user chooses to access the program, the user accesses the corresponding channel to watch the program according to the frequency and channel information.

(5) If the user refuses to access the program, the user closes the dialogue box, and the existing service is not interrupted (for example, the current program goes on).

The mode of renewing a program in the prior art involves at least the following problems:

The EPG includes information about multiple channels and multiple programs, and it is troublesome for the user to search for an episode of a TV series manually. For example, if the user wants to renew a TV series, the user needs to search for each episode of the TV series and renew the episode separately. Therefore, the user operations are complicated. In addition, the user has to keep looking up the EPG for the program to be renewed, and tends to miss many programs which are more wonderful than the currently played program. When multiple channels are playing the same TV series, the user generally does not know the information about the same TV series played on multiple channels.

SUMMARY OF THE INVENTION

The embodiments of the present invention provide a method, an apparatus and a system for renewing a program so that successive programs can be renewed automatically after multiple program series or associated programs are set as the successive programs of a renewed program.

A method for renewing a program in an embodiment of the present invention includes:

obtaining programs associated with a set renewed program according to the set renewed program;

using one or more of the obtained associated programs as successive programs to the renewed program; and renewing the successive programs automatically.

An apparatus for renewing a program in an embodiment of the present invention includes:

a setting unit, configured to set a program as a renewed program;

a searching and obtaining unit, connected to the setting unit, and configured to search program information for programs associated with the renewed program according to the renewed program set by the setting unit; and a renewal processing unit, connected to the searching and obtaining unit, and configured to use one or more of the associated programs obtained by the searching and obtaining unit as successive programs to the renewed program, and renew the successive programs automatically.

A system for renewing a program in an embodiment of the present invention includes:

a server, configured to provide program information;

a play device, connected to the server through a network, and configured to display an interface of the program information and play a corresponding program; and a renewal apparatus, connected to a display device and connected to the server through the play device, and configured to renew programs set for renewal automatically according to the program information provided by the server.

In the technical solution under the present invention, the information about a renewed program is combined with the play information of a successive program of the renewed program to generate program renewal information, where the play information of the successive program is found in the program information (such as EPG information); and the successive program is renewed automatically according to the program renewal information. This method brings at least these benefits: Programs in multiple series or programs associated with a program can be renewed automatically, which overcomes the problems in the prior art, namely, separate renewal of every episode of a program series or separate renewal of programs associated with a renewed program, complicated user operations, and poor user experiences.

BRIEF DESCRIPTION OF THE DRAWINGS

To make the technical solution under the present invention or in the prior art clearer, the following describes the accompanying drawings involved in the description of the embodiments of the present invention or the prior art. Apparently, the accompanying drawings described below are exemplary only and not exhaustive, and persons of ordinary skill in the art can derive other drawings from such accompanying drawings without any creative effort.

FIG. 10 and FIG. 11 show an interface for querying and setting information at the time of playing a favorite program in an embodiment of the present invention;

DETAILED DESCRIPTION OF ILLUSTRATIVE EMBODIMENTS

The following detailed description is provided with reference to the accompanying drawings to provide a thorough understanding of the present invention. Evidently, the drawings and the detailed description are merely representative of particular embodiments of the present invention, and the embodiments shall be regarded as illustrative in nature and not exhaustive or restrictive. All other embodiments, which can be derived by those skilled in the art from the embodiments provided herein without any creative efforts, fall within the scope of the present invention.

A method, an apparatus, and a system for renewing a program enable automatic renewal of programs in multiple series after the user uses such programs to follow a set renewed program by performing one renewal operation. Specifically, the method searches for the programs associated with the renewed program from the program information (for example, EPG information) according to the renewed program set by the user, uses one or more of the obtained associated programs as successive programs to the renewed program, and renews the successive programs automatically. This method is simple. When the start time of a renewed program meets, the system reminds the user to watch the program, and renews the successive programs that follow the renewed program automatically, thus overcoming the inconvenience of the prior art which requires the user to renew episodes of the program one by one and therefore requires the user to renew the whole program series by performing multiple renewal operations.

To make the present invention clearer, the following provides details about the implementation process of the present invention with reference to the accompanying drawings and embodiments.

First Embodiment

Figure 1:
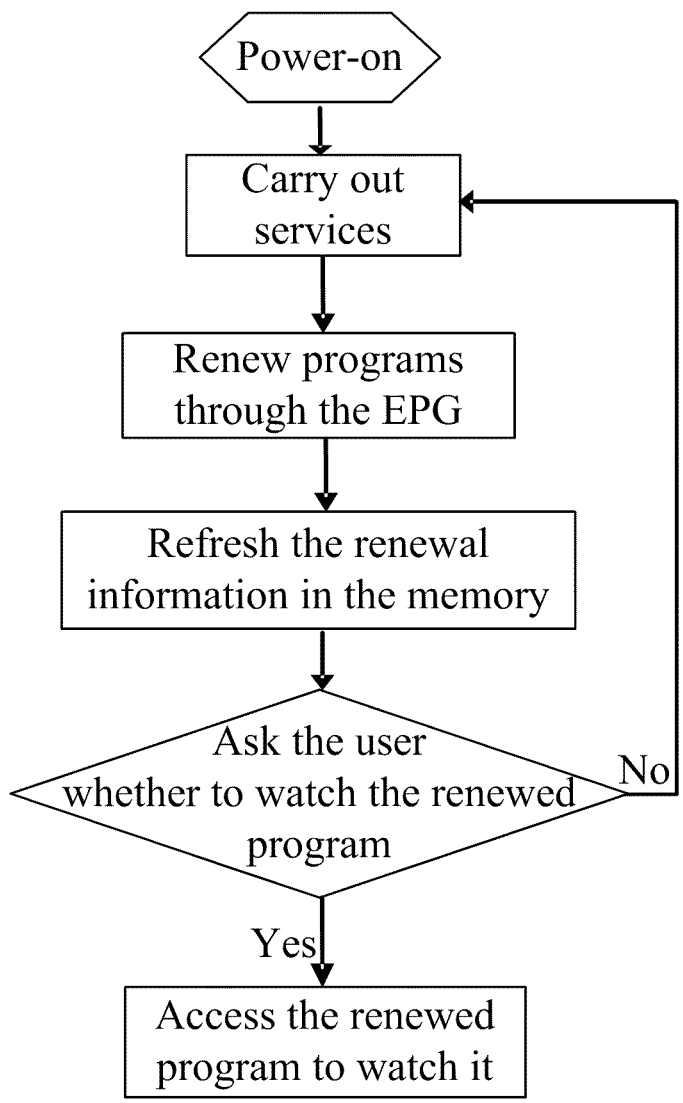
FIG. 1 shows a logical block diagram of a processing procedure of a renewal method in the prior art.
Figure 2:
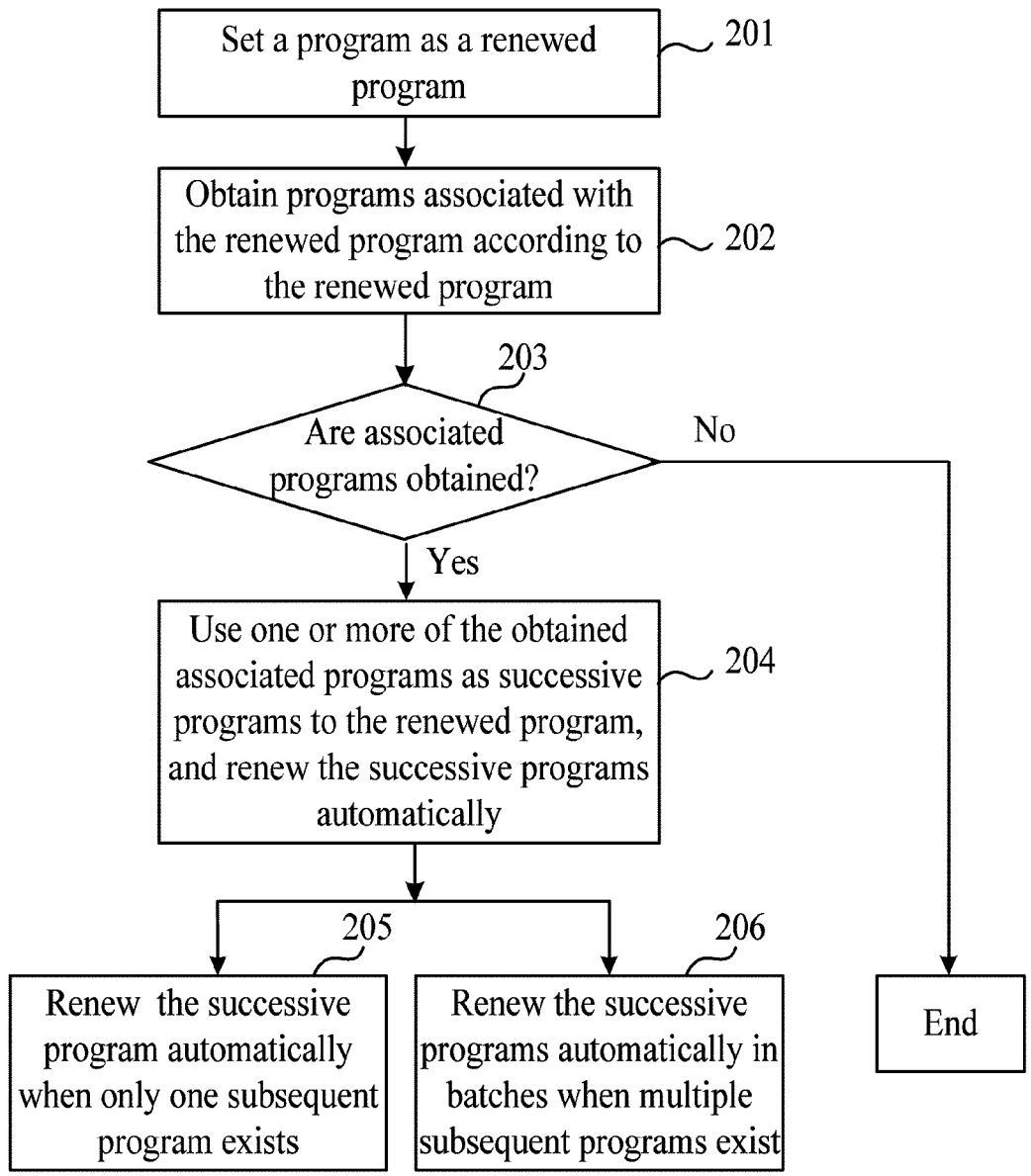
FIG. 2 is an overall flowchart of a renewal method in an embodiment of the present invention.

As shown in FIG. 2, a method for renewing a program (for example, TV programs and online Video on Demand (VoD) programs) enables the user to renew multiple programs in a series by performing one renewal operation. The procedure includes the following steps:

Step 201: Set a program as a renewed program.

The currently played program or one or more of the programs browsed in the EPG program information may be set as renewed programs.

Step 202: Obtain programs associated with the renewed program according to the set renewed program.

There may be one or more associated programs, which may be programs in the default renewed channel corresponding to the renewed program, or may be programs in all channels except the default renewed channel, or programs in all channels that include both the default renewed channel and other channels. Associated programs refer to the programs whose program identifier and program content are successive to the renewed program, or the programs which are successive to the renewed program and are in the same series as the renewed program.

Step 203: If the associated programs are obtained, perform step 204; if no associated program is obtained, confirm that no associated program exists (namely, no successive program is available for renewal), and terminate the process of renewal.

Step 204: Use one or more of the obtained associated programs as successive programs to the renewed program, and renew the successive programs automatically.

In practice, a selected successive program may be marked to be in the default renewed state. The system checks whether the program is in the default renewed state; and, if so, renews the program automatically. If one program is selected as the successive program, namely, the program whose program identifier or play time is successive to the current renewed program, step 205 is performed subsequently; if multiple programs are selected as successive programs, all obtained associated programs may be set as successive programs, and step 206 is performed subsequently.

Step 205: If one of the obtained associated programs is selected as the successive program, set the successive program as a renewed program when the play time of the selected successive program meets, obtain programs associated with this renewed program according to the information about the renewed program, use one of the obtained associated programs as a successive program to the renewed program, and renew the successive program automatically. Repeat this step until no program associated with the current renewed program is available, and then complete the renewal.

Step 206: Renew all the multiple successive programs automatically in the order of the program identifier or play time if all the obtained programs are used as successive programs to the renewed program. For example, input the information about the order of the successive programs into a schedule, and renew the programs one by one according to the schedule.

Alternatively, select a program whose program identifier or play time is successive to the renewed program among multiple successive programs, and use the selected program as the successive program to follow the current renewed program. When the play time of the successive program meets, set the successive program as a renewed program. Repeat this process until no associated program is available.

"Repeat this process until no associated program is available" in step 206 includes: When all the obtained successive programs are renewed and the current renewed program is the last one of the successive programs, continue to obtain the programs associated with the successive program according to the current successive program, and use the obtained associated programs as successive programs for automatic renewal. Repeat this process until no associated program is available, and then complete the renewal.

Figure 3:
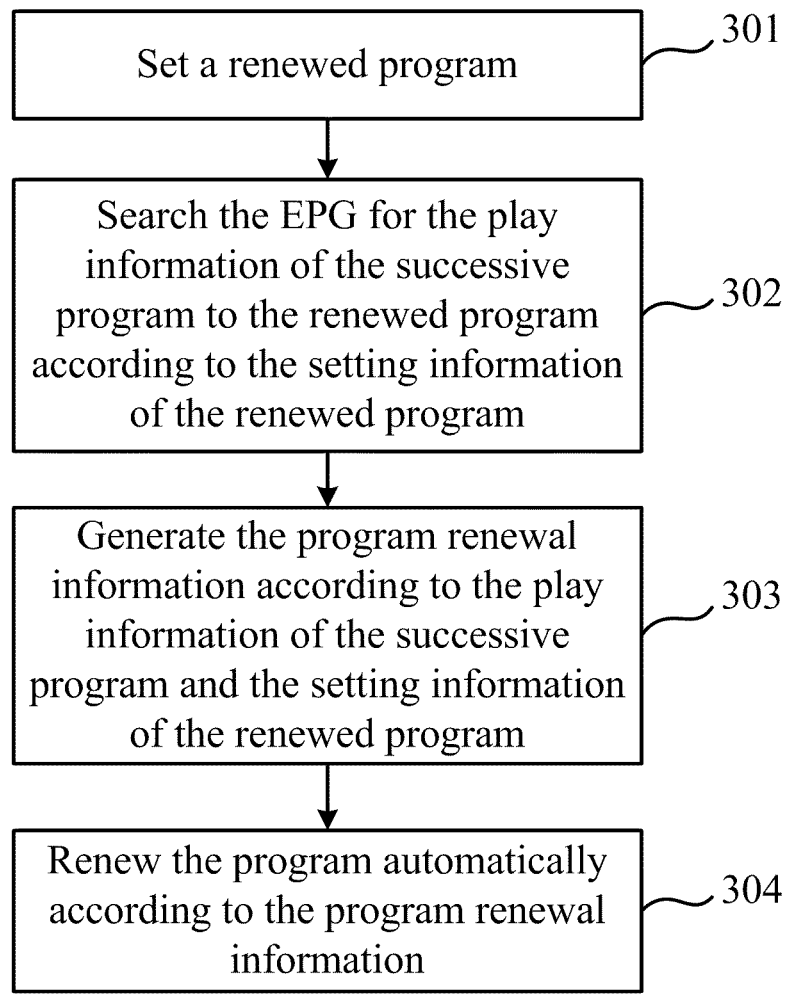
FIG. 3 shows a processing procedure of a renewal method in a practical application in an embodiment of the present invention.

The procedure of the foregoing method in a practical application is described in more detail below. As shown in FIG. 3, the procedure is as follows:

Step 301: Set the browsed or played program in the EPG as a renewed program.

The favorite program may be set as a renewed program, which comes in two scenarios:

(1) In the EPG browse state, one or more programs in the EPG may be set as renewed programs.

(2) In the program playing state, only the currently played program can be set as the renewed program.

Step 302: Search the EPG for the play information of the successive program to the renewed program according to the setting information of the renewed program.

The setting information of the renewed program includes: program identifier (for example, the program name, and identifier of a type of programs), play time, and default renewed channel number, or any combination thereof. In this embodiment, the setting information includes the program name and the default renewed channel number, and the specific operations of this step are to search for the play information of the successive program to the renewed program according to the program name of the renewed program in the default channel of EPG corresponding to the default renewed channel number.

Step 303: Generate program renewal information according to the play information of the successive program to the renewed program obtained in step 302 and the setting information of the renewed program.

The generated program renewal information includes: program name, default renewed channel number, name of the program available for renewal, renewing by default or not, and play time.

Step 304: Renew the program automatically according to the generated program renewal information. That is, if the program name is consistent with the name of the program available for renewal, and the program is renewed by default, the system reminds the user to watch the program automatically when the start time of the renewed program meets.

In the foregoing renewal method, the successive program to the renewed program may refer to the episode whose content is successive to the content of the renewed program; or refer to the program which is successive to the renewed program and is in the same series as the renewed program.

In the following detailed description, a TV series in which the episodes of programs are successive is taken as an example. In step 302 above, the program name in the information about the renewed program may be set in the following way:

(i) To facilitate retrieval of the program name of the TV series, the names comply with a uniform requirement at the time of publishing the program information of each channel in the EPG. The requirement may be:

(1) The same TV series has the same name.

(2) Name format: "name of TV series"+"("+"number of episodes or others"+")". For example, "The Tax File (11)", "The Tax File (eleventh)", or "The Tax File (Finale)".

(3) The "( )" may be SBC or DBC case brackets, or other characters such as "< >", "[ ]", or "{ }" so long as the characters can delimit the name and the flag (such as a sequence number) of each episode.

(ii) Method for obtaining the program name of the TV series from the server:

The program name of the renewed TV series is obtained from the EPG information delivered by the server, for example, "The Tax File (11)". Through string interception, the content in the last pair of brackets (or other delimiters) is intercepted. The field obtained after interception (such as "The Tax File") is the name of the TV series.

Figure 4:
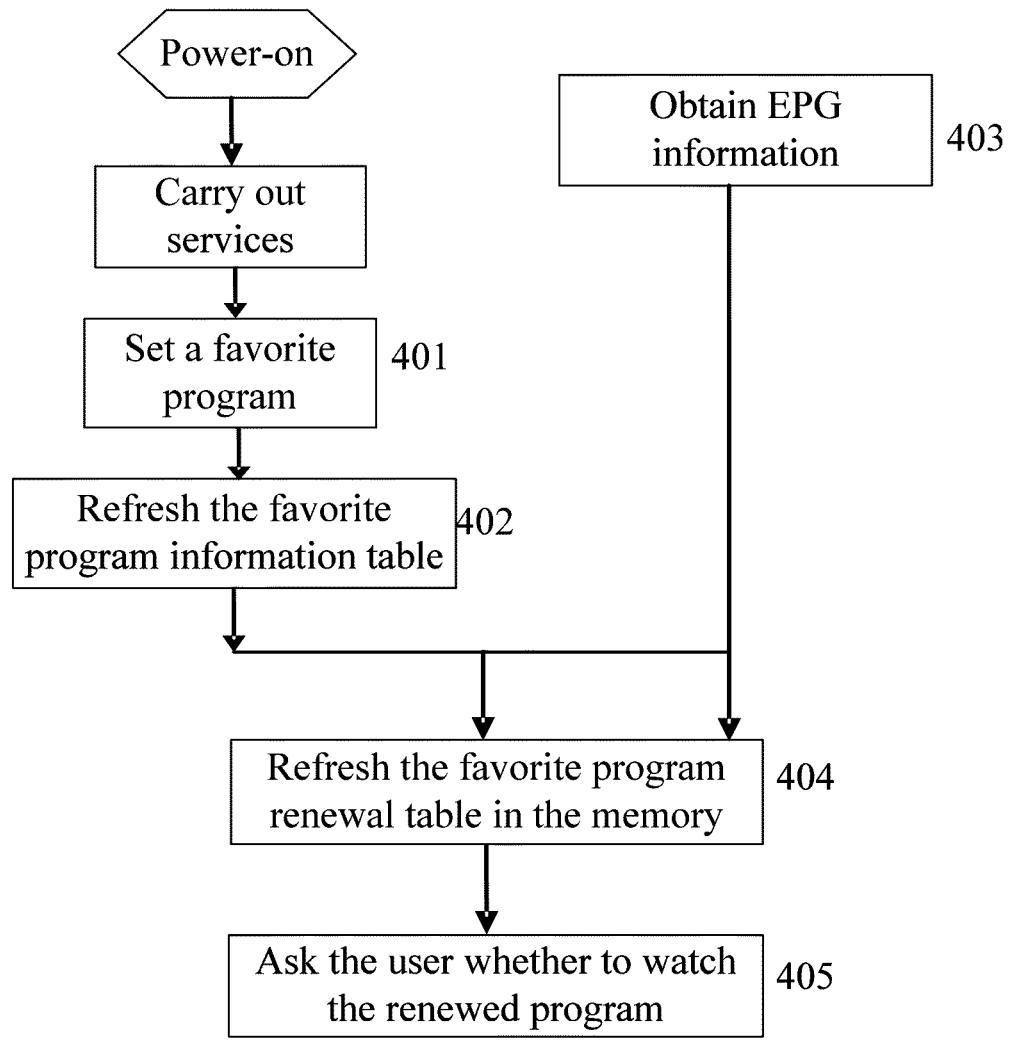
FIG. 4 shows a logical block diagram of a service processing procedure in an embodiment of the present invention.

In a practical application, this renewal method is generally applied in the STB, and is also applicable to the integrated digital TV set, online live system, and mobile online live broadcast system. In the following description, it is assumed that the renewal method in this embodiment is applied to the STB. As shown in FIG. 4, the procedure includes the following steps:

Step 401: When the user watches the program, the user may set the currently played program as a favorite program through the STB, or set a program as a favorite program by performing operations on the EPG when browsing the EPG. The set favorite program is ready for renewal.

Step 402: The STB refreshes the favorite program information table in the non-volatile memory in the STB automatically according to the favorite program information set in step 401.

Step 403: The STB obtains the EPG information.

Step 404: A favorite program renewal table is generated in the memory of the STB according to the EPG information obtained in step 403 and the favorite program information table in step 402.

Step 405: When the renewed program in the favorite program renewal table starts to be played, the STB reminds the user to watch the program, and refreshes the favorite program renewal table in the memory.

Figure 5:
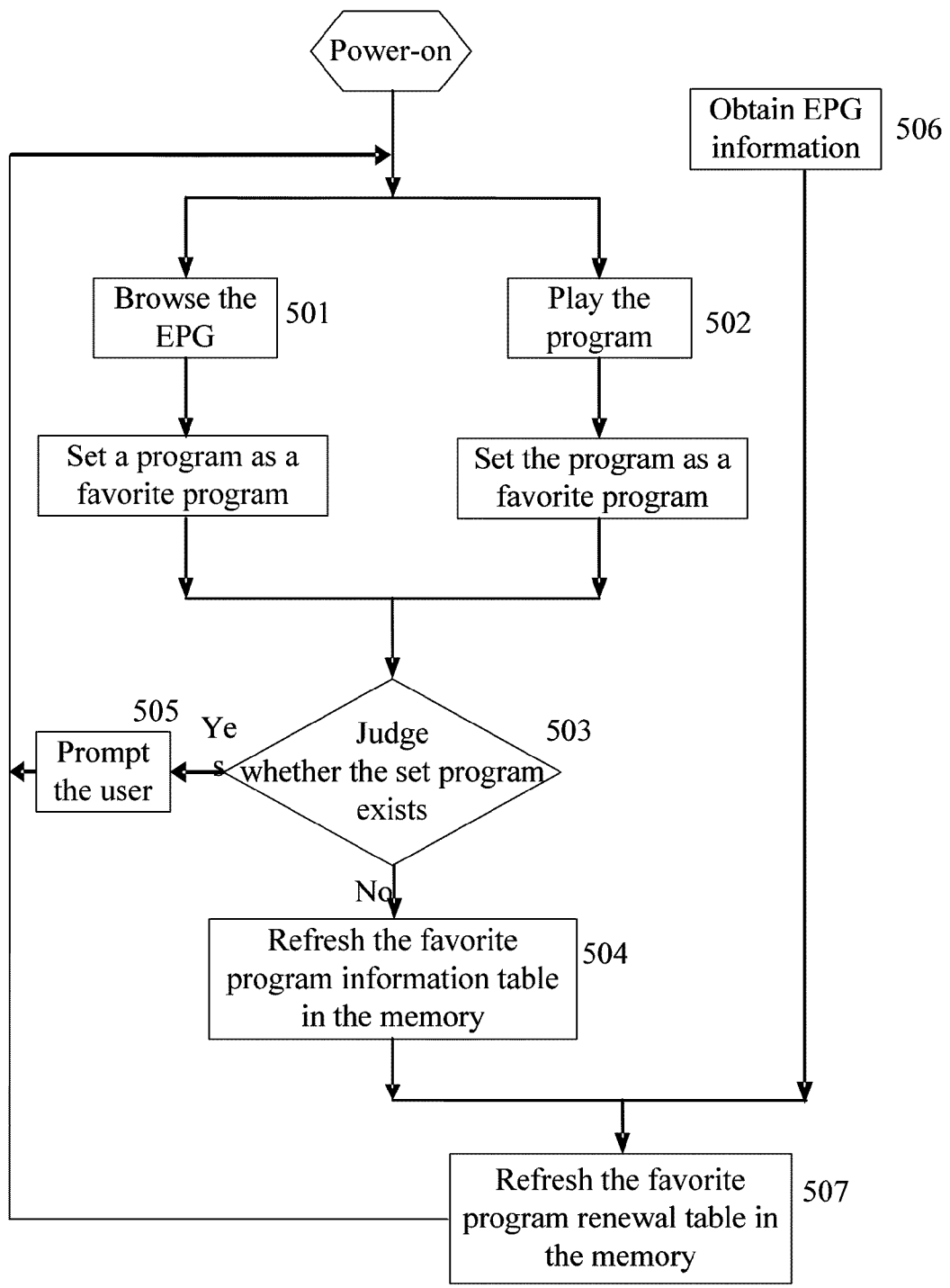
FIG. 5 shows a logical block diagram of setting favorite programs and renewing a program in an embodiment of the present invention.

As shown in FIG. 5, the procedure for setting and storing the favorite program in step 401 and step 402 above includes the following steps:

Step 501: In the EPG browse state, the user may set one or more programs in the EPG as favorite programs; or Step 502: In the program playing state, the user sets the currently played program as a favorite program.

Step 503: The STB judges whether the set program already exists in the favorite program information table. If the set program does not exist, the procedure proceeds to step 504, and the STB stores the name and channel number of the TV series into the favorite program information table of the non-volatile memory; if the set program exists, the procedure proceeds to step 505, and the user is prompted that the program is already set as favorite.

Step 506: The STB obtains the EPG information.

Step 507: The favorite program renewal table in the memory is refreshed according to the EPG information obtained in step 506 and the settings configured in step 503 and step 504.

In the foregoing method, the favorite program renewal table is stored into the memory of the STB after being generated. The content in the table needs to be generated and refreshed continuously as required, and may be refreshed in the following mode:

(1) refreshed at the time of updating the favorite program information table; or (2) refreshed at the time of powering on or waking up the STB; or (3) refreshed after starting play of the renewed program; or (3) refreshed in the memory at a fixed time point such as 1:00 a.m. that is set in the software.

That is, the program renewal table needs to be refreshed in time whenever the favorite program changes, the EPG information changes, or the corresponding conditions are fulfilled, to keep the latest content and ensure accuracy of the renewal.

The favorite program information table includes the following content (see Table 1):

A. name of the favorite program of the TV series.

B. default renewed channel number (namely, the sequence number of the channel that bears the favorite program); and A and B above may serve as EPG information delivered by the server to the renewal apparatus (such as the STB).

TABLE 1

| Table Name | Favorite program information table | |
|---|---|---|
| | Name of Program of TV Series | Default Renewed Channel Number |
| Favorite program information table | XXX | 13 |
| | YYY | 18 |
| | ZZZ | 28 |
| | ... | |

Figure 6:
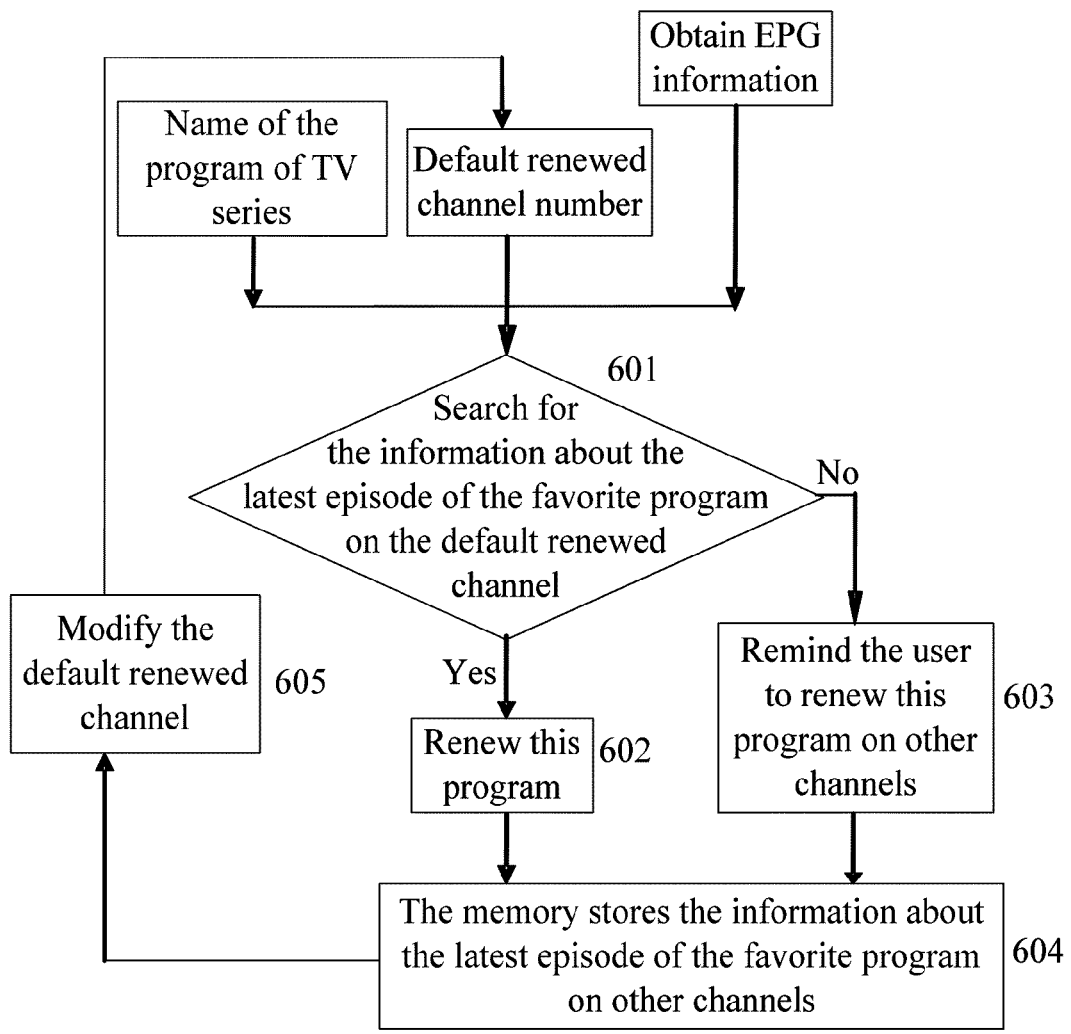
FIG. 6 shows a logical block diagram of generating and refreshing a favorite program renewal table in an embodiment of the present invention.

According to the information in the favorite program information table, the procedure for generating and refreshing the favorite program renewal table is shown in FIG. 6. The procedure includes the following steps:

Step 601: Search for the information (such as play information) about the latest episode of the favorite program on the default renewed channel.

Step 602: If the corresponding program information is found, store the program information, and set the program as renewed by default. If no corresponding information is found, proceed to step 603, and remind the user to renew this program on another channel.

Step 604: Search for the information about the latest episode of this favorite program on other channels, and store the found information.

Step 605: If the user has changed the renewed channel, refresh the default renewed channel number first, and then repeat the foregoing procedure.

The generated favorite program renewal table includes the following information shown in Table 2:

TABLE 2

| Table Name | Favorite program renewal table | | | | |
|---|---|---|---|---|---|
| | Name of Program of TV Series | Channel Number | Renewed by Default or Not | Name of Program Available for Renewal | Time of Play |
| Favorite program renewal table | XXX | 3 | Yes | XXX(11) | 20080808 13:00-14:30 |
| | XXX | 13 | No | XXX(15) | 20080808 18:00-19:30 |
| | XXX | 18 | No | XXX(6) | 20080808 21:00-22:30 |
| | YYY | 13 | Yes | YYY(88) | 20080808 15:00-16:30 |
| | YYY | 16 | No | YYY(52) | 20080808 16:00-17:30 |
| | YYY | 28 | No | YYY(5) | 20080808 21:00-22:30 |
| | ... | ... | ... | ... | ... |

Figure 7:
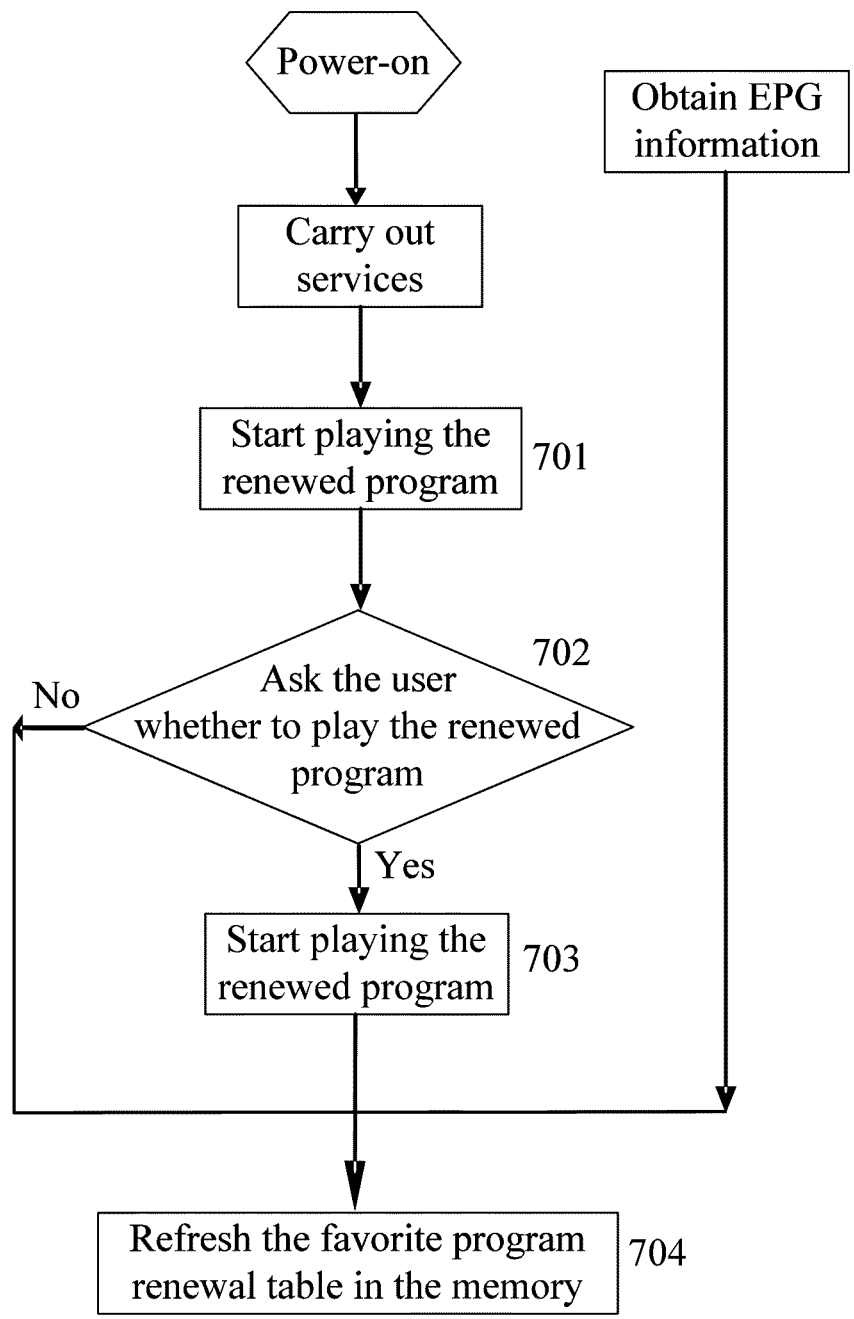
FIG. 7 shows a logical block diagram of playing a renewed program and renewing successive programs in an embodiment of the present invention.

As shown in FIG. 7, the procedure for playing a renewed program and renewing successive programs automatically is as follows:

Step 701: A dialogue box appears when the play time of the renewed program meets, asking the user whether to access the renewed program.

Step 702: If the user chooses to access the program, perform step 703 and the user watches the renewed program; if the user chooses not to access the program, the existing service continues.

Step 704: The system refreshes the favorite program renewal table in the memory automatically according to the obtained EPG information, and renews the next episode of the watched TV series.

Figure 8:
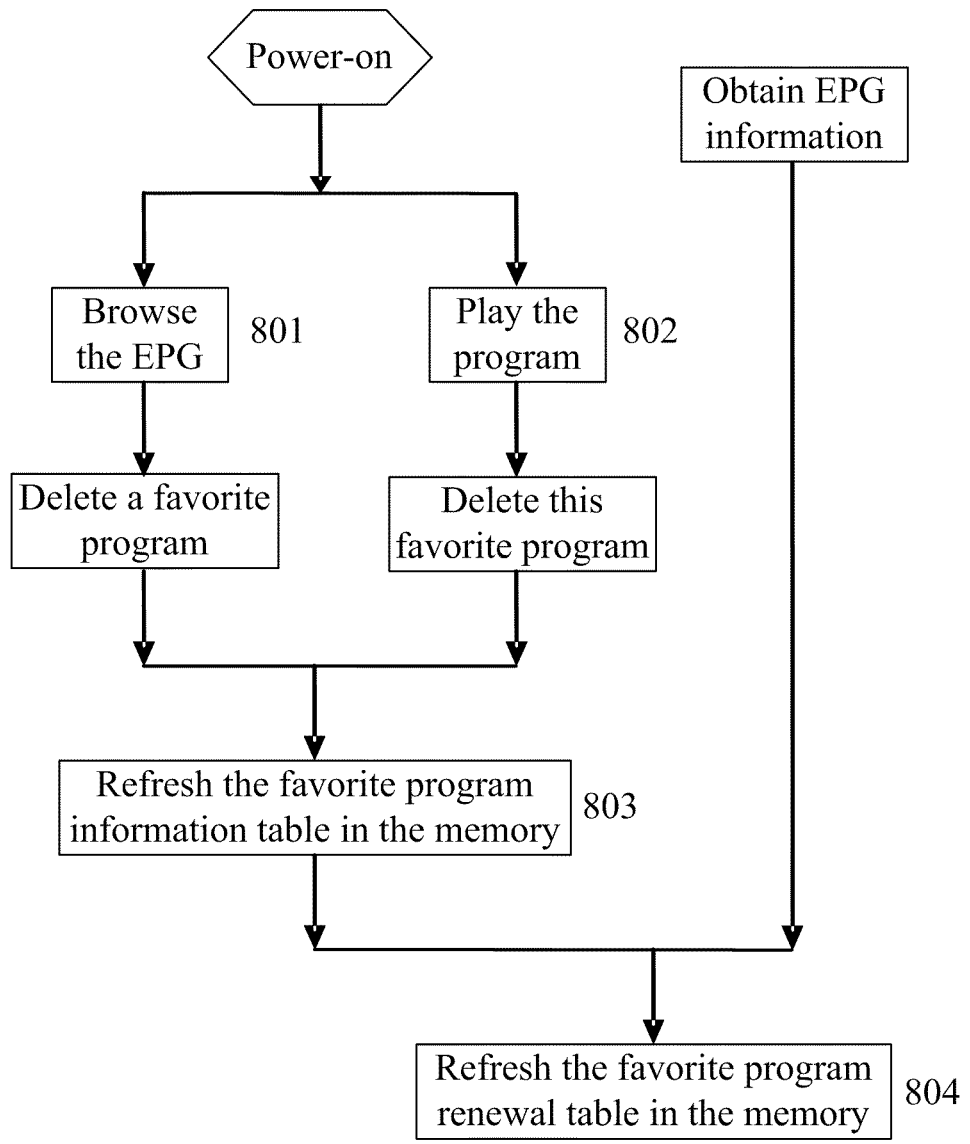
FIG. 8 shows a logical block diagram of deleting a favorite program in an embodiment of the present invention.

The renewed program set as a favorite program may also be deleted, queried, and set. The user may delete the favorite program at the time of browsing the EPG and playing the favorite program. As shown in FIG. 8, the procedure for deleting a favorite program includes the following steps:

Step 801: In the EPG browse state, the user may delete any favorite program; or step 802: In the program playing state, the user can delete only the currently played favorite program.

Step 803: The favorite program information table in the non-volatile memory is refreshed.

Step 804: The favorite program renewal table in the memory is refreshed.

Figure 9:
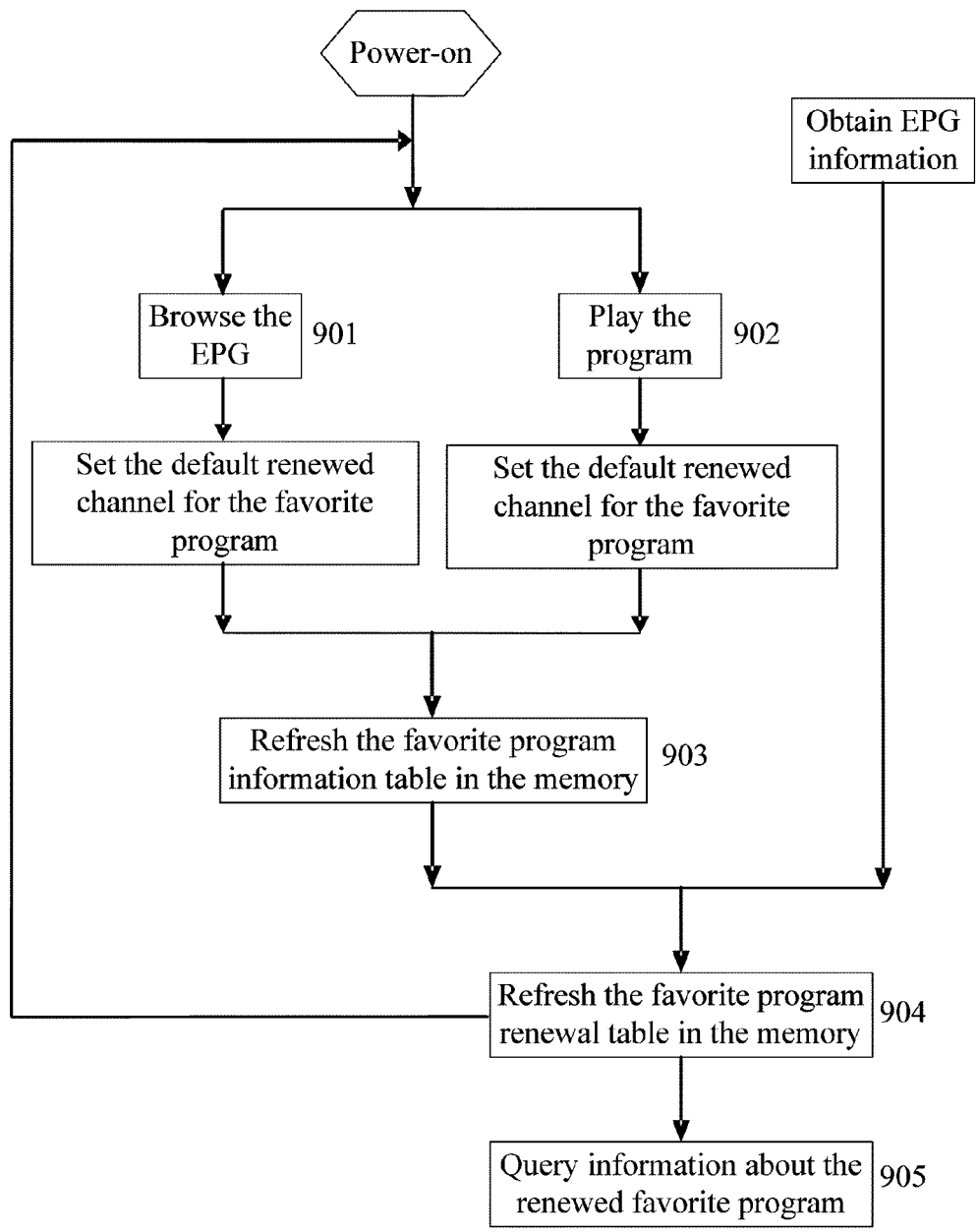
FIG. 9 shows a logical block diagram of querying and setting favorite programs in an embodiment of the present invention.

The user may query the favorite program and set the default renewed channel through the EPG. As shown in FIG. 9, the procedure includes the following steps:

The user may query the favorite program renewal table in the memory of the STB anytime:

Step 901: The user may set the default renewed channel of the favorite program when browsing the EPG or playing the program (step 902), for example, set another channel as a default renewed channel, or set multiple channels as default renewed channels.

Step 903: After the default renewed channel is set, the favorite program information table in the non-volatile memory of the STB is refreshed.

Step 904: The favorite program renewal table in the memory of the STB is refreshed according to the obtained EPG information.

Figure 10:
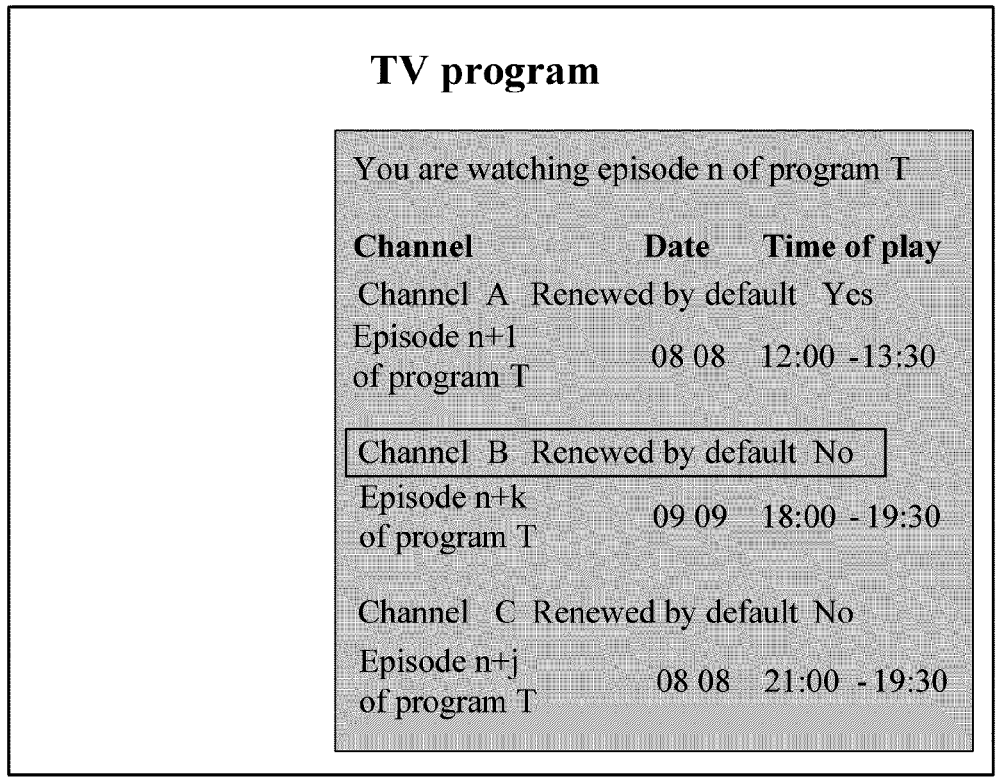

Step 905: When a favorite program is played, the user can query the information or state of the favorite program by performing certain operations (such as double clicking). FIG. 10 shows an effect of a page for querying and setting a favorite program which is played currently.

In this interface state, the user can query the play information and state of the favorite program on other channels (if k, j>0, it indicates that the progress of the program on the other channel is faster than that of the current channel; if k, j=0, it indicates that the progress of the program on the other channel is equal to that of the current channel; if k, j<0, it indicates that the progress of the program on the other channel is slower than that of the current channel).

In the interface state shown in FIG. 10, the user may press keys to modify the channel as a default renewed channel or not. When this channel bears no favorite program, the system directly prompts the user that the channel provides no favorite program.

FIG. 11 shows an effect of querying and setting a page in the playing state. When a non-favorite program is played, the user can query the information and state of the favorite program on this channel by performing certain operations (such as double clicking).

Figure 12:
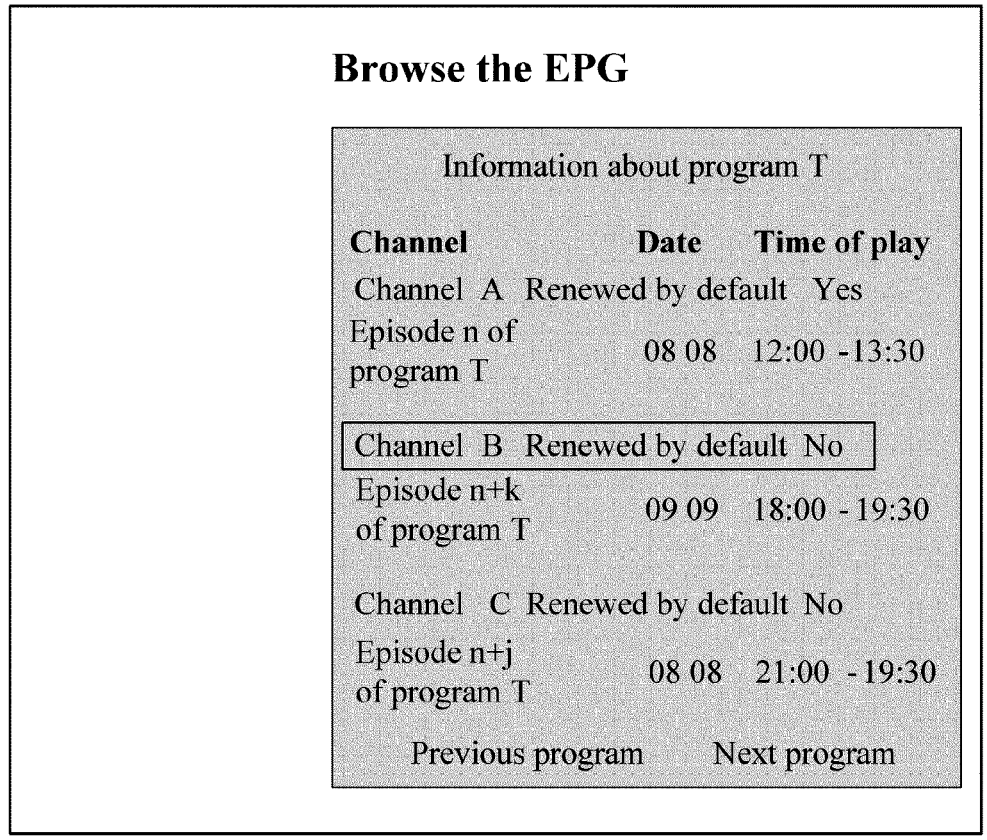
FIG. 12 shows an interface for querying and setting favorite program information browsed on an EPG in an embodiment of the present invention.

In the interface state shown in FIG. 12, the user can query the play information and state of the favorite program on other channels (if k, j>0, it indicates that the progress of the program on the other channel is faster than that of the current channel; if k, j=0, it indicates that the progress of the program on the other channel is equal to that of the current channel; if k, j<0, it indicates that the progress of the program on the other channel is slower than that of the current channel).

In this interface state, the user may press keys to modify the channel as a default renewed channel or not. When this channel bears no favorite program, the system directly prompts the user that the channel provides no favorite program.

When no program is played, the user may browse the favorite program page of the EPG to query the information and state of all favorite programs. FIG. 11 shows an effect of the page for querying and setting the favorite program at the time of browsing the EPG. In this interface state, the user can query the play information and state of this favorite program on other channels (if k, j>0, it indicates that the progress of the program on the other channel is faster than that of the current channel; if k, j=0, it indicates that the progress of the program on the other channel is equal to that of the current channel; if k, j<0, it indicates that the progress of the program on the other channel is slower than that of the current channel).

Alternatively, the user may press keys to modify the channel as a default renewed channel or not. Through "Previous" and "Next" displayed on the interface, the user may query information and state of the previous program or the next program. If a channel bears no favorite program, the system prompts the user that the channel provides no favorite program.

Evidently, after one renewal operation is performed, the method provided in this embodiment can automatically renew multiple episodes whose content is continuous, and enable cross-channel organization of the program information provided in the EPG, thus enhancing functions of the devices and facilitating the user operation massively.

Second Embodiment

This embodiment provides a method for renewing a program to enable automatic renewal of programs which have neither continuous content nor continuous episodes, but are a category of associated programs (such as sports programs, science and education programs, or legal programs). To renew the category of associated programs conveniently and efficiently, a common program identifier may be set for the associated programs on the server. The program identifier identifies this category of associated programs and facilitates automatic renewal of the programs. The program identifier may be Chinese characters, numbers, letters, or any combination thereof. Provided below is an exemplary scenario after a common identifier is set for the associated programs.

A common identifier "DWJM" is set for the associated programs such as "Animal World (12)", "Animal Discovery", and "Animal Paradise". The associated programs are correlated so that the "Animal World (12)", "Animal Discovery", and "Animal Paradise" form associated programs in multiple series through the set identifier. In practice, other identifiers may be set for the associated programs as long as this category of associated programs forms associated programs in multiple series and differs from other programs.

The "Animal World (12)", "Animal Discovery", and "Animal Paradise" identified by the program identifier "DWJW" form associated programs which are in multiple series, and the associated programs are combined with the play time of each program in the EPG. That is, the program successive to the current program set as a renewed program serves as the successive program. That is, the successive program is determined according to the play time of the program. The remaining steps of renewing the associated programs in multiple series automatically are similar to the method described in the first embodiment above.

The renewal method in this embodiment enables automatic renewal of the programs which have neither continuous episodes nor continuous content but are a category of associated programs. This is convenient for the user to watch TV programs greatly, and enables automatic renewal of the programs which have different names but can be sorted into one category.

Third Embodiment

This embodiment provides a method for renewing a program. This method uses all obtained programs associated with the currently renewed program as successive programs. This method includes the scenario of searching for and obtaining the associated programs among all channels. The method is detailed below:

The programs associated with the renewed program are obtained according to the currently set renewed program information.

Generally, the associated programs may be found in the EPG according to the program identifier (such as the program name, or program identifier that identifies a category of programs). Multiple programs corresponding to the found matched items are the associated programs. Multiple associated programs serve as successive programs, and the multiple successive programs are renewed automatically.

The successive programs may be renewed automatically in many modes. The following two modes are example only:

(1) Form a schedule according to the order of the successive programs, and renew the successive programs one by one according to the content of the schedule; or (2) Select a program whose program identifier or play time is successive to the renewed program among multiple successive programs, and use the selected program as the successive program to the current renewed program. When the play time of the successive program meets, set the successive program as a renewed program. Afterward, find the next successive program for renewing. Repeat this process until no associated program is available.

"Repeat this process until no associated program is available" in mode (2) above is: When all the obtained successive programs are renewed and the current renewed program is the last one of the successive programs, continue to obtain the programs associated with the renewed program according to the current renewed program, and use the obtained associated programs as successive programs for automatic renewal. Repeat this process until no associated program is available, and then complete the renewal.

In a practical application, multiple set successive programs are marked to be in the default renewed state. Automatic renewal is performed according to the default renewal flag and the play information of the successive programs. That is, the programs set to be in the default renewed state are arranged in the order of the program identifier or play time. When the play time of the next program arrives, the system asks the user whether to play the program. Regardless of whether the user chooses to play the program, because the play time of the program has arrived, it is confirmed that the process of renewing the program that follows the current renewed program is completed, and this next program is set as the current renewed program automatically. Afterward, the program that follows this renewed program is renewed automatically. This process goes on until all programs marked in the default renewed state are renewed, whereupon new associated programs are obtained. The new associated programs are renewed automatically until no more associated program is available, and then the renewal process is completed.

The foregoing method for renewing multiple obtained successive programs automatically is applicable to all associated programs obtained from the default channel or from other channels. Moreover, the details of applying the renewal method in this embodiment to a practical application have been provided in the first embodiment above.

This renewal method renews multiple associated programs automatically by performing one renewal operation when the multiple associated programs are found in the EPG, thus facilitating the user operations greatly and avoiding the trouble of renewing every program in a series of programs or a category of programs one by one.

Fourth Embodiment

This embodiment provides a method for renewing a program. On the basis of the renewal method in the first embodiment above, this embodiment reminds the user of the associated programs (namely, favorite programs) set as renewed programs. The method includes:

obtaining the property information of the associated programs (namely, favorite programs) according to the set renewed program (favorite program), and then displaying the property information of the programs associated with the renewed program.

In the foregoing method, the property information of programs includes: classified information of the program, program name, keywords of program content, start time of the program, and end time of the program.

The details of displaying the property information of the programs associated with the renewed program include:

scrolling the property information on the upper side or lower side of the screen through a scrollbar; and/or scrolling the property information in a specific position of the screen through a mini-window. The scrolling refers to circulating the property information in the order of start time of the program.

Moreover, the foregoing method may include: deleting the scrolling prompt information about the program if the current time is later than the end time of the selected program compliant with the favorite program type information.

Figure 13:
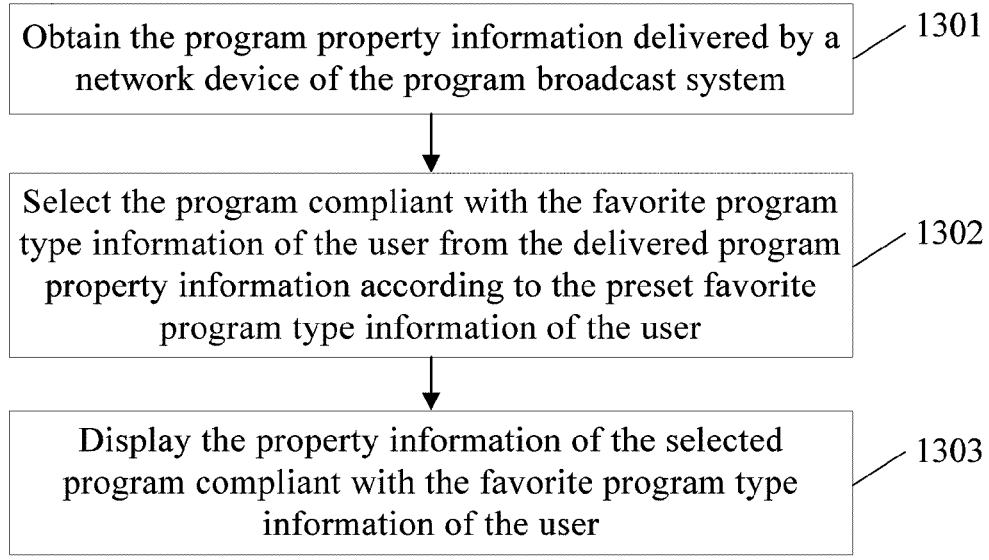
FIG. 13 is a flowchart of a fourth method embodiment of the present invention.

The foregoing method is described below in more detail with reference to FIG. 13. The steps in FIG. 13 are as follows:

1301. Obtain the program property information delivered by a network device of the program broadcast system.

In this step, the program property information delivered by the network device of the program broadcast system includes: classified information of the program, program name, keywords of program content, start time of the program, and end time of the program.

1302. Select the program compliant with the favorite program type information of the user from the delivered program property information according to the preset favorite program type information of the user.

In this step, the favorite program type information of the user includes: classified information of the program, program name, start time of the program, end time of the program, and keywords; the details of selecting the program compliant with the favorite program type information of the user from the delivered program property information are: selecting the program according to the classified information of program, or through keyword searching, or according to the play time of the program. The details of selecting the program compliant with the favorite program type information of the user according to the play time of the program are: selecting the program according to the start time of the program; and/or selecting the program according to the end time of the program.

1303. Display property information of the selected program compliant with the favorite program type information of the user.

In this step, the details of displaying the property information of the program compliant with the favorite program type information of the user include: scrolling the property information on the upper side or lower side of the screen through a scrollbar; and/or scrolling the property information in a specific position of the screen through a mini-window. The scrolling is to circulate the property information in the order of the start time of the program; and the scrolling prompt information about the program is deleted if the current time is later than the end time of the selected program compliant with the favorite program type information.

Fifth Embodiment

Figure 14:
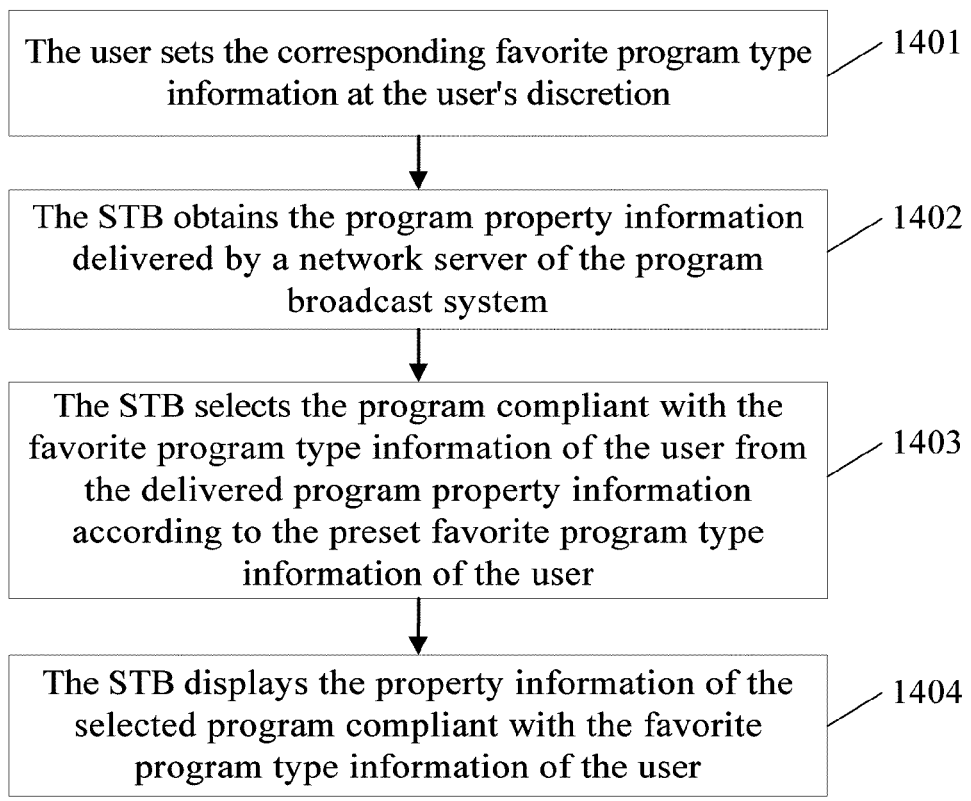
FIG. 14 is a flowchart of a fifth method embodiment of the present invention.

As shown in FIG. 14, this embodiment describes a method for reminding the user in the renewal process specified in the fourth embodiment above:

1401. The user sets the corresponding favorite program type information at the user's discretion. This step may be construed as: The user sets a favorite program as a renewed program at the user's discretion.

In this step, the favorite program type information may include: classified information of the program, program name, start time of the program, end time of the program, or keywords, or any combination thereof. That is, when setting the property information of the favorite program, the user may set the property information of only one program, or set the property information of multiple programs. For example, the program type information may be the classified information such as "Sports"—"Ball Games"—"Football"; the program type information may be the program name such as "Discovery"; the program type information may be the start time of the program such as "19:00"; the program type information may be the end time of the program such as "21:00"; the program type information may be keywords such as "Prime Minister", and "Liu Luo Guo". Or composite program property information is set according to multiple types of program property information; for example, in the program property information, the classified information is "Sports"—"Ball Games"—"Football", the play time of the program is "19:00", and the keyword is "Europe".

1402. The STB obtains the program property information delivered by a network server of the program broadcast system.

In this step, the program falls within a range set by the user. For example, if the user is interested in the broadcast programs in the week, the user may set a time range from Monday to the weekend, and download the program property information in this time range. Such program property information may be stored in the Event Information Table (EIT) in the EPG, or stored in other modes. The program property information includes: classified information of the program, program name, keywords of program content, start time of the program, and end time of the program. The classified information of the program conveys as much prompt information as possible to the user, and may include but without being limited to: live broadcast, sports, news, history operas, and cartoons. The delivered data table may be expanded in multiple levels, for example, the first level is "TV series", the second level is "history opera", and the third level is "Emperor Wu of Han". The number of levels depends on the series and type of the programs provided by the operator. The program property information may be downloaded from the network server in the existing network, for example, the existing broadcast network, or existing IP network. The specific transmission network is not limited.

It should be noted that the program property information may be defined by a user, namely, a user sets different program type tags at the user's discretion according to different program types. For example, a user is interested in sports, and therefore, the user may set a "sports" tag in the program type tag, set "track and field", "ball games", "gym", and "swim" as level-2 tags, set "table tennis", "badminton", "basketball", and "football" as level-3 tags under the level-2 tag "ball games", and set "European Football League" "Olympic Games Football Events", and "Asian Football Confederation" as level-4 tags under the level-3 tag "football".

The user may set all levels of the classified information in the program property information, or set the main levels only. The detailed levels associated with the program property information may be delivered by the network server.

1403. The STB selects the program compliant with the favorite program type information of the user from the delivered program property information according to the preset favorite program type information of the user. This step is equivalent to obtaining programs associated with the renewed program according to the set renewed program.

In step 1403, the STB selects the program compliant with the favorite program type information of the user from the delivered program property information according to the preset favorite program type information of the user. The STB selects the program according to the classified information of the program, or through keyword searching, or according to the play time of the program. The details of selecting the program compliant with the favorite program type information of the user according to the play time of the program are: selecting the program according to the start time of the program; and/or selecting the program according to the end time of the program. For example, if the user wants to watch the football match starting at 19:00, the user presets the property information of the favorite program. In the preset property information, the keyword is "football", and the start time of the program is 19:00. In this way, the STB determines the program satisfying such conditions in the program property information downloaded from the network server.

Figure 15:
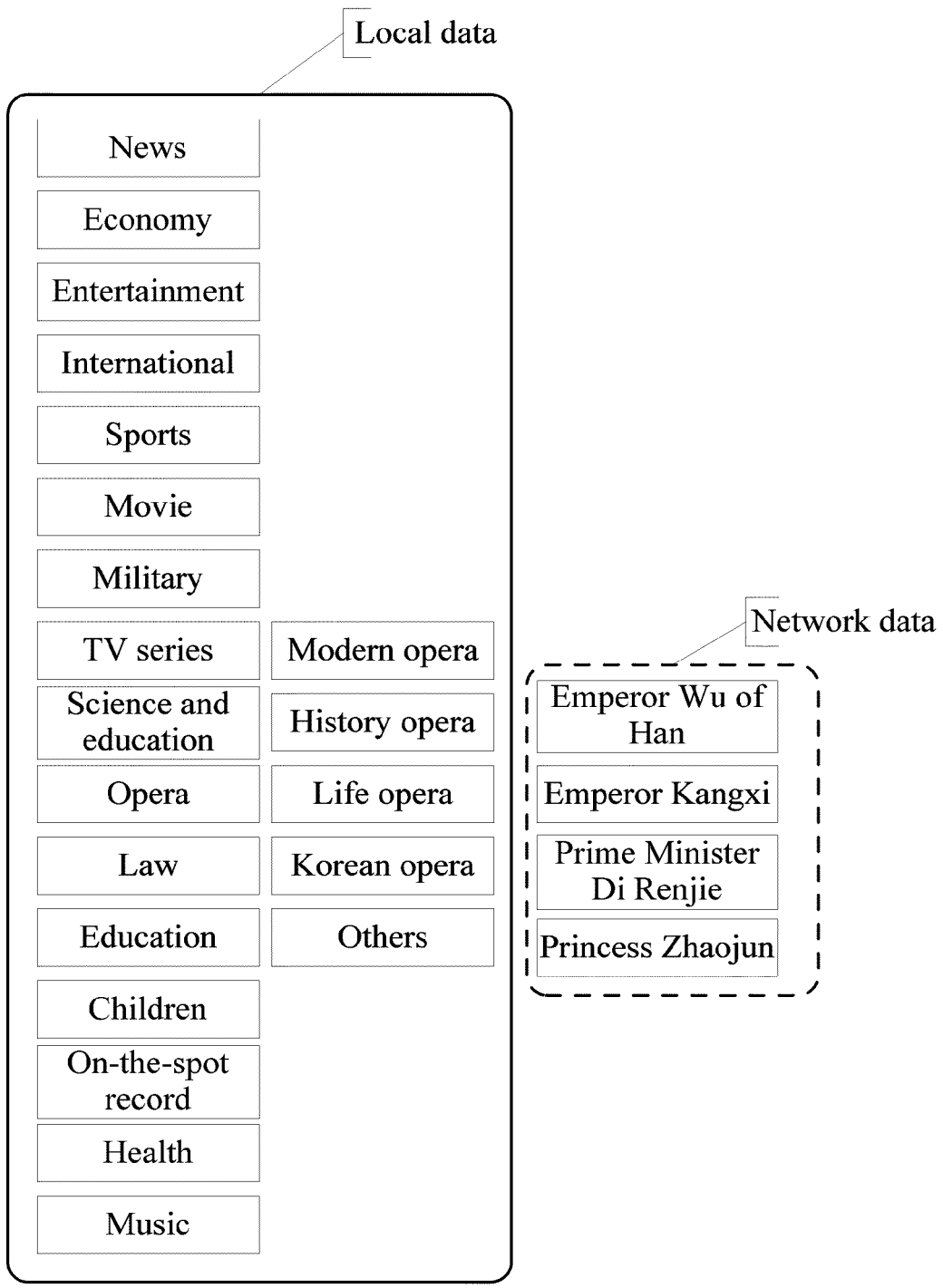
FIG. 15 shows layout of classified information of programs in the fifth method embodiment of the present invention.

At the time of selecting the program according to the favorite program property information preset by the user, the program may be retrieved within one channel, or from multiple channels. If the programs corresponding to the same program property information are retrieved from different channels, the programs are candidates to be selected by the user. As shown in FIG. 15, the classified information is classified into three levels. The first two levels are set by the user, and the third level is provided by the network server.

The favorite program property information already set by the user can be recorded by the device, and the setting is effective until the user changes the setting. That is, when the user watches the program next time, the device still determines the favorite program of the user according to the favorite program property information set previously.

1404. The STB displays the property information of the selected program compliant with the favorite program type information of the user.

After the property information of the program compliant with the favorite program type information of the user is determined in step 1403, the STB displays the property information in the current play interface by: scrolling the property information on the upper side or lower side of the screen through a scrollbar; and/or scrolling the property information in a specific position of the screen through a mini-window. The scrolling is to circulate the property information in the order of start time of the program.

The displayed property information of the program is deleted if the current time is later than the program end time indicated in the program property information.

The user may select "Cancel prompt" to cancel a prompt about the determined program property. That is, a "Cancel prompt" key exists on the remote control of the STB; when the user does not want to display the prompt about a program, the user may press the "Cancel prompt" key when the STB displays the prompt about this program, and the prompt of this program will not be displayed any longer.

In the process of implementing this solution, if the program property information delivered by the network server includes no associated information on other frequencies, the program content may be delivered independently of the program information table through multi-channel receiving of the STB, as detailed below:

(1) Multiple tuners are applied. One tuner is used for receiving program content, and the other tuner is used for receiving program information. On the network server, the program content and the program information are modulated and multiplexed through different frequencies, and then the operator may choose to encrypt the program information. The data is matched on the STB so that the STB obtains the favorite program information of the user and scrolls the information on the screen.

(2) On the network server, the program information is delivered through an Out-Of-Band (OOB) channel. The operator may choose to encrypt the program information. The OOB data is matched on the STB so that the STB obtains the favorite program information of the user and scrolls the information on the screen.

(3) On the network server, the program information is delivered through a Transport Control Protocol/Internet Protocol (TCP/IP), and the data is resolved on the STB. Through data matching, the STB obtains the favorite program information of the user and scrolls the information on the screen.

(4) On the network server, the program information is delivered in wireless mode. That is, a wireless module is added on the STB or integrated digital TV set to receive the program information. The program information is delivered by the network server through Global System for Mobile communications (GSM), General Packet Radio Service (GPRS), Wideband Code Division Multiple Access (WCDMA), CDMA2000, Time Division-Code Division Multiple Access (TD-CDMA), Worldwide Interoperability for Microwave Access (WiMAX), or Long Term Evolution (LTE), or through a local wireless access technology, including but not limited to Wireless Fidelity (WiFi), Bluetooth, and Ultra-Wideband (UWB).

It should be noted that although some steps in this embodiment are not interpreted, persons of ordinary skill can implement such steps according to the previous embodiment and the prior art.

Sixth Embodiment

Figure 16:
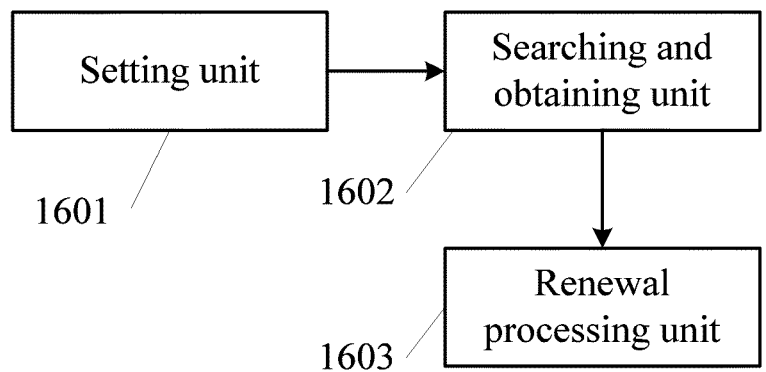
FIG. 16 shows a structure of a renewal apparatus in an embodiment of the present invention.

As shown in FIG. 16, an apparatus for renewing a program is provided in this embodiment. The apparatus is applicable to the STB, integrated digital TV set, online live broadcast system, and mobile online live broadcast system to implement the program renewal method under the present invention. The apparatus includes:

a setting unit 1601, configured to set a program as a renewed program, where the program is currently played or selected from program information;

a searching and obtaining unit 1602, connected to the setting unit 1601, and configured to search EPG information for programs associated with the renewed program according to the renewed program set by the setting unit 1601; and a renewal processing unit 1603, connected to the searching and obtaining unit 1602, and configured to use one or more of the associated programs obtained by the searching and obtaining unit 1602 as successive programs to the renewed program, and renew the successive programs automatically.

In practice, the renewal apparatus may further include: a renewal information generating unit (not illustrated), connected to the searching and obtaining unit 1602 and the setting unit 1601, and configured to generate program renewal information according to the associated program play information obtained by the searching and obtaining unit 1602 and the renewed program information set by the setting unit 1601, thus making it convenient to automatically renew the associated programs set as successive programs according to the program renewal information.

Moreover, the foregoing renewal apparatus may include a storing unit (not illustrated), which is configured to store the obtained associated program information to facilitate subsequent processing.

Figure 17:
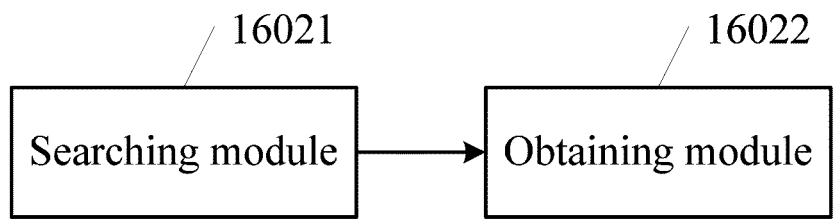
FIG. 17 shows a structure of a searching and obtaining unit in a renewal apparatus in an embodiment of the present invention.

As shown in FIG. 17, the searching and obtaining unit 1602 of the foregoing renewal apparatus includes:

a searching module 16021, configured to search the EPG information for the item that matches the renewed program information according to the renewed program information set by the setting unit 1601; and an obtaining module 16022, connected to the searching module 16021, and configured to check the EPG information to obtain the play information of the program corresponding to the matched item found by the searching module.

Figure 18:
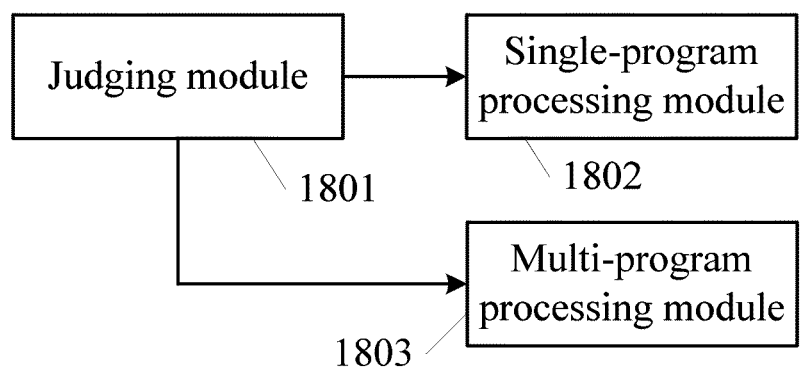
FIG. 18 shows a structure of a renewing unit in a renewal apparatus in an embodiment of the present invention.

As shown in FIG. 18, the renewing unit in the foregoing renewal apparatus includes:

a judging module 1801, configured to judge whether one or more successive programs are selected from the associated programs according to the associated program information stored in the storing unit (not illustrated);

a single-program processing module 1802, connected to the judging module 1801, and configured to: set the successive program as a renewed program when the play time of the selected successive program meets if it is determined that only one successive program is selected, obtain programs associated with this renewed program, use one of the obtained associated programs as a successive program to the renewed program, and renew the successive program automatically; and repeat this process until no program associated with the current renewed program is available; and a multi-program processing module 1803, connected to the judging module 1801, and configured to renew the programs one by one in the order of the program identifier or play time of multiple successive programs if it is determined that multiple successive programs are selected.

The renewal apparatus in this embodiment is conveniently applicable to the STB, integrated digital TV set, online live broadcast system, or mobile online live broadcast system, enhances the functions of the device or system, and improves convenience of user operations. The renewal apparatus enables automatic renewal of the programs in one or more channels, where the programs have multiple continuous episodes or not, or are not continuous. The renewal apparatus overcomes the defect that the prior art can renew only a single episode of continuous programs in a single channel.

Seventh Embodiment

This embodiment provides an apparatus for renewing a program. This apparatus provides a reminding function on the basis of the renewal apparatus specified in the sixth embodiment above. This apparatus includes:

a program information displaying unit, configured to display the property information of the determined favorite program of the user on the current page.

Figure 19:
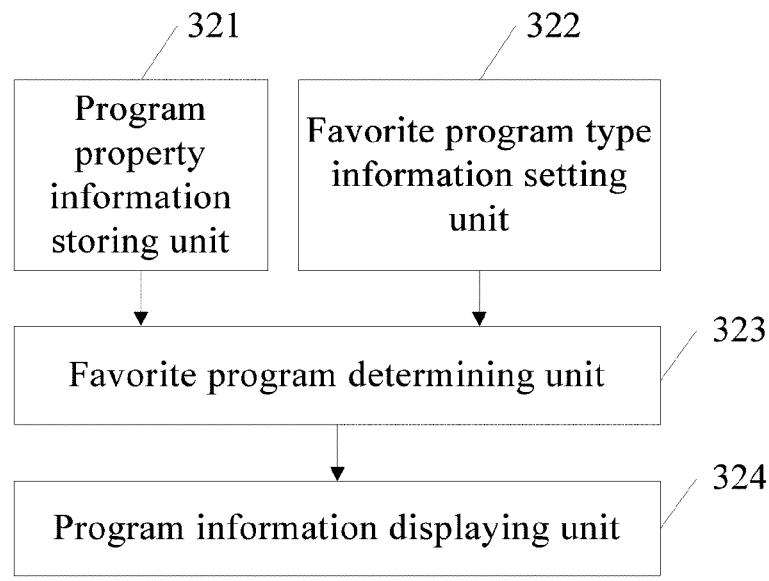
FIG. 19 shows a structure of a renewal apparatus provided in a seventh embodiment of the present invention.

This apparatus is described below in more detail with reference to FIG. 19. As shown in FIG. 19, the apparatus includes: a program property information storing unit 321 (equivalent to the storing unit of the renewal apparatus in the sixth embodiment), a favorite program type information setting unit 322 (equivalent to the setting unit of the renewal apparatus in the sixth embodiment), a favorite program determining unit 323 (equivalent to the searching and obtaining unit of the renewal apparatus in the sixth embodiment), and a program information displaying unit 324.

The program property information storing unit 321 is configured to store the program property information delivered by a network server.

The program property information includes: classified information of the program, program name, keywords of program content, start time of the program, and end time of the program.

The favorite program type information setting unit 322 is configured to set the favorite program type information of the user.

The favorite program type information includes: classified information of the program, program name, start time of the program, end time of the program, or keywords, or any combination thereof.

The favorite program determining unit 323 is configured to determine the favorite program of the user in the program property information delivered by the network server according to the favorite program type information preset by the user.

The program information displaying unit 324 is configured to display the property information of the determined favorite program of the user on the current page.

Figure 20:
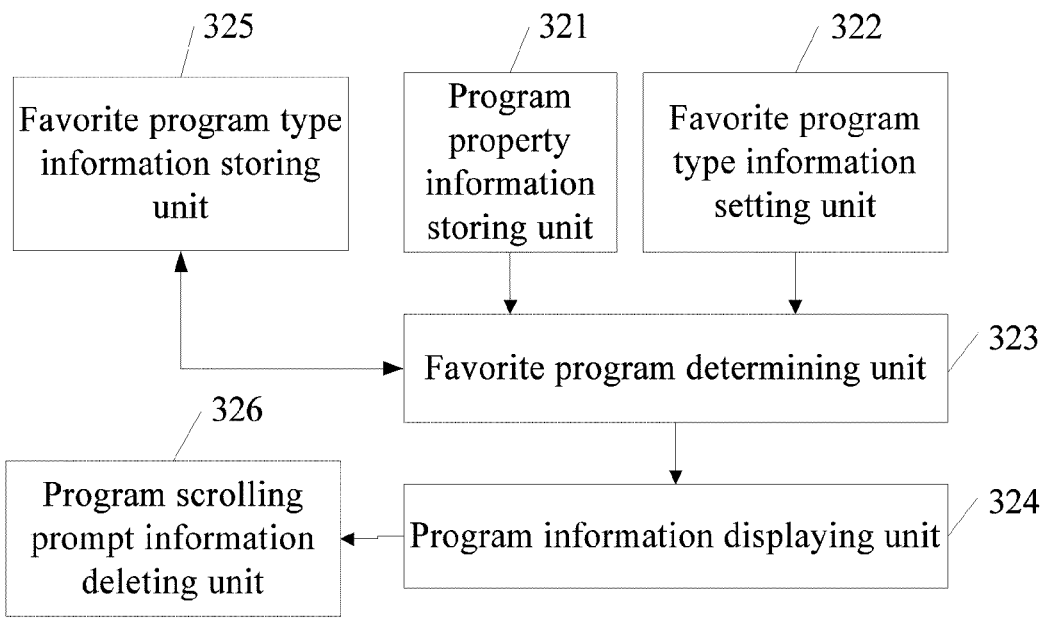
FIG. 20 shows another structure of a renewal apparatus provided in the seventh embodiment of the present invention.

As shown in FIG. 20, the apparatus may further include:

a favorite program type information storing unit 325, configured to store the favorite program type information of the user for the purpose of determining the favorite program of the user subsequently; and a program scrolling prompt information deleting unit 326, configured to delete the scrolling prompt information about the program if the current time is later than the end time of the selected program compliant with the favorite program type information.

Figure 21:
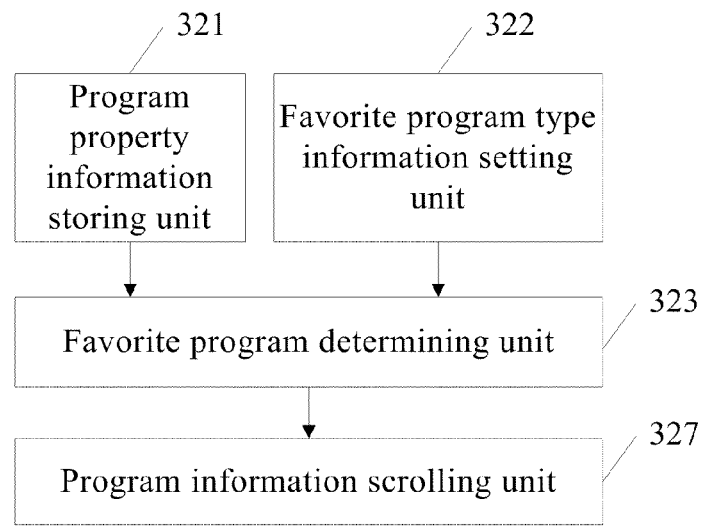
FIG. 21 shows a third structure of a renewal apparatus provided in the seventh embodiment of the present invention.
Figure 22:
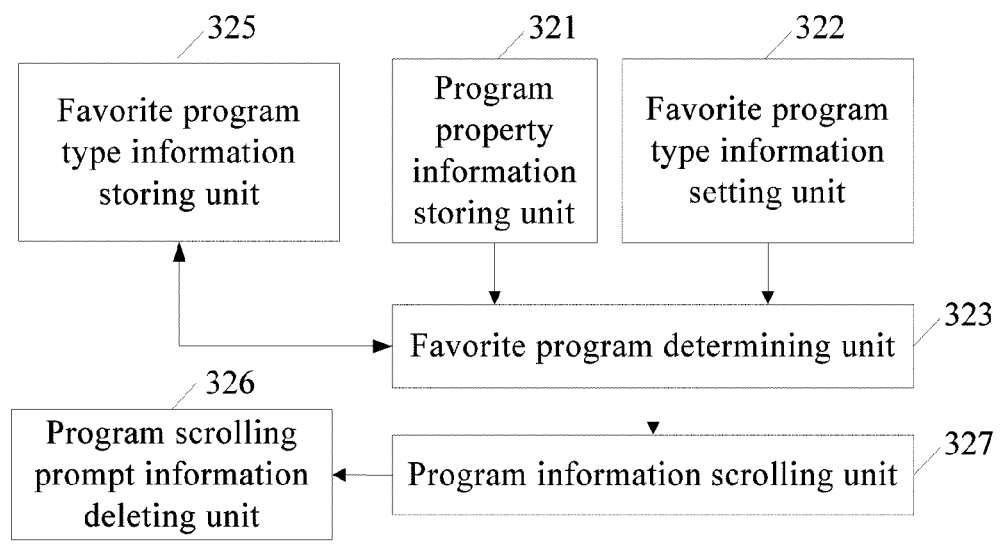
FIG. 22 shows a fourth structure of a renewal apparatus provided in the seventh embodiment of the present invention.

As shown in FIG. 21, the program information displaying unit 324 in the foregoing apparatus may include:

a program information scrolling unit 327, configured to scroll the property information of the determined favorite programs of the user on the screen in the order of start time of the programs.

The scrolling mode may be: scrolling the property information on the upper side or lower side of the screen through a scrollbar; and/or scrolling the property information in a specific position of the screen through a mini-window.

The program property information includes: classified information of the program, program name, keywords of program content, start time of the program, and end time of the program. The favorite program type information includes: classified information of the program, program name, start time of the program, end time of the program, or keywords, or any combination thereof.

Through the technical solution in this embodiment, the user sets the favorite program type by performing one renewal operation, and the STB selects the favorite program of the user from the program information delivered by the network device according to the program type set by the user, and displays the favorite programs to the user to remind the user. This technical solution overcomes the defect in the prior art that requires the user to keep searching the EPG content for the favorite programs. This technical solution enables the user to see the favorite program play information without complicated operations, the operation process is friendly and the user experience is improved.

Eighth Embodiment

Figure 23:
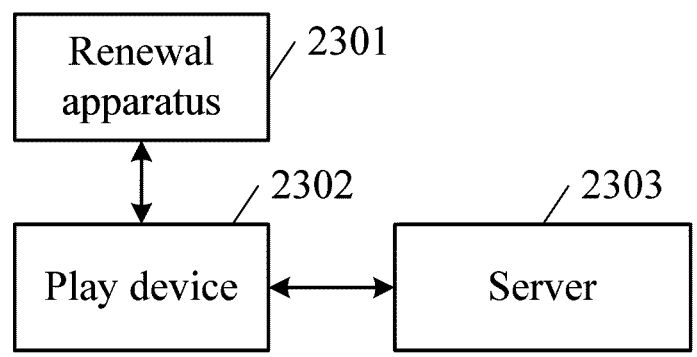
FIG. 23 shows connections between parts of a renewal system in an embodiment of the present invention.

As shown in FIG. 23, a system for renewing a program is provided in this embodiment. The system implements the renewal method disclosed in the present invention and includes:

a server 2303, configured to provide EPG information;

a play device 2302, connected to the server 2303 through a network, and configured to display an interface of the EPG information and play a corresponding program; and a renewal apparatus 2301, for example, the renewal apparatus provided in the sixth embodiment or the seventh embodiment, connected to the play device 2302, and connected to the server 2303 through the play device 2302, and configured to: automatically renew the programs set as renewed programs according to the EPG information provided by the server 2303, obtain the property information of the programs associated with the renewed programs according to the renewed programs set by the setting unit, and display the property information on the current page. In practice, the renewal apparatus may be an STB, or an integrated digital TV set.

In conclusion, the renewal method under the present invention enables automatic renewal of a program including continuous episodes after one renewal operation is performed, where a program renewal table is generated according to the information about the favorite programs set as renewed programs and the EPG information. For example, if a TV series includes 50 episodes, the traditional mode requires the user to operate repeatedly (even perform operations for 50 times) to renew the whole program series. In an embodiment of the present invention, the user sets this program as favorite, and the whole series can be renewed automatically. Further, the programs which do not have multiple episodes or are not continuous can be put into one category and form multiple series, and can be renewed automatically. The method disclosed in the present invention brings the following benefits additionally: The program information can be organized across channels; the information about the same favorite TV series can be searched among multiple channels, and this is convenient for the user to select a different channel for renewing; the renewed program can be refreshed in many modes, thus ensuring the program information to be correct and real-time; the user can query the play time of the favorite program and the play information of the program on other channels anytime; the user can manage the favorite programs; and the user can choose to renew a program on multiple different channels.

Although the method for renewing a program herein takes the TV program as an example, those skilled in the art can apply the technical solution under the present invention to the process of renewing any programs played in series, and to the process of renewing any programs renewed according to keywords and program content.

The above descriptions are merely exemplary embodiments of the present invention, but are not intended to limit the scope of the present invention, and the order of the embodiments provided herein shall not be construed as a limitation to the present invention. Any modifications, variations or replacements that can be easily derived by those skilled in the art without departing from the spirit and scope of the invention should fall within the scope of the present invention. Therefore, the scope of the present invention is subject to the appended claims.

What is claimed is:

1. A method for renewing a program, comprising:
generating program renewal information associated with a set renewed program according to play information of the renewed program and play information of a plurality of programs listed in electronic program guide information;

and
when a start time of the renewed program meets, reminding to watch the renewed program while renewing at least one successive programs pointed by the program renewal information without user operation, wherein the successive programs are to be played after the play of the renewed program on a same play device;

wherein the successive programs pointed by the program renewal information includes the following programs:

programs whose program identifier and program content are successive to the renewed program; or programs which are successive to the renewed program and are in a same series as the renewed program.

2. The method for renewing a program according to claim 1, wherein the step of generating program renewal information associated with a set renewed program according to play information of the renewed program and play information of a plurality of programs listed in electronic program guide information comprises:

searching a default renewed channel corresponding to the renewed program and/or other channels to generate the program renewal information associated with the renewed program according to a program identifier of the renewed program.

3. The method for renewing a program according to claim 1, wherein if the number of the at least one successive programs is one, the step of renewing at least one successive programs automatically comprises:

setting the successive program as a renewed program when a play time of the successive program meets, generating program renewal information associated with this renewed program, and when a start time of this renewed program meets, reminding to watch this renewed program while renewing a successive program pointed by the program renewal information associated with this renewed program without user operation; and repeating the foregoing process until no successive program is available.

4. The method for renewing a program according to claim 3, wherein a program whose program identifier or play time is successive to the current renewed program is the successive program to the renewed program.

5. The method for renewing a program according to claim 1, wherein if the number of the at least one successive programs are more than one, the step of renewing at least one successive programs automatically comprises:

renewing the at least one successive programs one by one in order of program identifier or play time of the programs.

6. The method for renewing a program according to claim 5, wherein the step of renewing the at least one successive programs one by one in the order of program identifier or play time of the programs comprises:

selecting a program whose program identifier or play time is successive to the current renewed program, and using this program as the successive program to the current renewed program; when the play time of the successive program meets, setting the successive program as a renewed program; and repeating the foregoing process until no successive program is available.

7. The method for renewing a program according to claim 6, wherein the step of repeating the foregoing process until no successive program is available comprises:

when the current renewed program is the last one of the at least one successive programs, generating program renewal information associated with the current renewed program according to play information of the current renewed program and play information of a plurality of programs listed in the electronic program guide information, and renewing a successive program pointed by the program renewal information associated with the current renewed program without user operation; and repeating this process until no successive program is available.

8. The method for renewing a program according to claim 7, further comprising:

completing the renewal if no successive program is available.

9. The method for renewing a program according to claim 1, wherein the renewed program is set by the following steps:

setting one or more programs in browsed electronic program guide information as renewed programs, or setting a currently played program as the renewed program.

10. The method for renewing a program according to claim 1, further comprising:

displaying the program renewal information.

11. The method for renewing a program according to claim 10, wherein the program renewal information comprises:

classified information of the program, program name, keywords of program content, start time of the program, and end time of the program.

12. The method for renewing a program according to claim 10, wherein the step of displaying the program renewal information comprises:

scrolling the program renewal information on a lower side or upper side of a screen through a scrollbar; and/or scrolling the program renewal information in a specific position of the screen through a mini-window.

13. The method for renewing a program according to claim 12, wherein:

the scrolling refers to circulating the program renewal information in order of start time of the program.

14. The method for renewing a program according to claim 13, further comprising:

deleting scrolling prompt information about the program if current time is later than end time of a selected program compliant with favorite program type information.

15. An apparatus for renewing a program, comprising:

a setting unit, configured to set a program as a renewed program;

a searching and obtaining unit, connected to the setting unit, and configured to generate program renewal information associated with the renewed program set by the setting unit according to play information of the renewed program and play information of a plurality of programs listed in electronic program guide information; and a renewal processing unit, connected to the searching and obtaining unit, and configured to when a start time of the renewed program meets, remind to watch the renewed program while renewing at least one successive programs pointed by the program renewal information without user operation, wherein the successive programs are to be played after the play of the renewed program on a same play device, wherein the successive programs pointed by the program renewal information includes the following programs:

programs whose program identifier and program content are successive to the renewed program; or programs which are successive to the renewed program and are in a same series as the renewed program.

16. The apparatus for renewing a program according to claim 15, wherein the searching and obtaining unit comprises:
- a searching module, configured to search the electronic program guide information for the renewed program that matches renewed program information set by the setting unit; and
- an obtaining module, connected to the searching module, and configured to check the electronic program guide information to obtain play information of the renewed program corresponding to the matched item found by the searching module.

17. The apparatus for renewing a program according to claim 15, wherein the renewal processing unit comprises:
- a judging module, configured to judge whether a single successive program or multiple successive programs are selected from the program renewal information;
- a single-program processing module, connected to the judging module, and configured to: set the successive program as a renewed program when a play time of the selected successive program meets if it is determined that a single successive program is selected, obtain program renewal information associated with this renewed program, and renew a successive program pointed by the program renewal information associated with this renewed program without user operation; and repeat this process until no successive program is available; and
- a multi-program processing module, connected to the judging module, and configured to renew multiple successive programs one by one in the order of program identifier or play time of multiple successive programs if it is determined that multiple successive programs are selected.

18. The apparatus for renewing a program according to claim 15, further comprising:
- a program information displaying unit, configured to display the program renewal information associated with the renewed program on a current page.

19. The apparatus for renewing a program according to claim 18, wherein the program information displaying unit comprises:
- a program information scrolling unit, configured to scroll the determined program renewal information in order of start time of the programs.

20. The apparatus for renewing a program according to claim 18, wherein the program information displaying unit further comprises:
- a program scrolling prompt information deleting unit, configured to delete scrolling prompt information about the programs pointed by the program renewal information if current time is later than end time of the programs pointed by the program renewal information associated with the renewed program.

21. A system for renewing a program, comprising:
- a server, configured to provide electronic program guide information;
- a play device, connected to the server through a network, and configured to display an interface of the electronic program guide information and play a corresponding program; and
- a renewal apparatus, connected to a display device and connected to the server through the play device, and configured to generate program renewal information associated with a set renewed program according to play information of the renewed program and play information of a plurality of programs listed in the electronic program guide information; and when a start time of the renewed program meets, remind to watch the renewed program while renewing at least one successive programs to the renewed program automatically according to the program renewal information without user operation, wherein the successive programs are to be played after the play of the renewed program on a same play device.

22. The system for renewing a program according to claim 21, wherein:
- the renewal apparatus is further configured to display the program renewal information.

\* \* \* \* \*